(12) United States Patent
Sack et al.

(10) Patent No.: US 11,074,363 B2
(45) Date of Patent: Jul. 27, 2021

(54) SELECTIVE AND TOTAL QUERY REDACTION

(71) Applicant: Oracle International Corporation, Redwood Shores, CA (US)

(72) Inventors: Patrick F. Sack, Ashburn, VA (US); William Maroulis, Ashburn, VA (US); Scott Gaetjen, Plano, TX (US); Mark Tatum, Manassas, VA (US); Mark E. Schultz, Reston, VA (US); Kenneth Westbrook, Vienna, VA (US); Ryan Feipel, Leesburg, VA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 292 days.

(21) Appl. No.: 16/211,097

(22) Filed: Dec. 5, 2018

(65) Prior Publication Data
US 2020/0184096 A1 Jun. 11, 2020

(51) Int. Cl.
| G06F 16/00  | (2019.01) |
| G06F 21/62  | (2013.01) |
| G06F 16/242 | (2019.01) |
| G06F 16/33  | (2019.01) |
| G06F 16/248 | (2019.01) |

(52) U.S. Cl.
CPC ........ *G06F 21/6245* (2013.01); *G06F 16/248* (2019.01); *G06F 16/2443* (2019.01); *G06F 16/3334* (2019.01)

(58) Field of Classification Search
None
See application file for complete search history.

(56) References Cited

U.S. PATENT DOCUMENTS

| 2009/0019092 A1 | 1/2009 | Dettinger |
| 2016/0283728 A1* | 9/2016 | Antonopoulos ........ H04L 9/008 |
| 2017/0344646 A1* | 11/2017 | Antonopoulos .... G06F 16/2453 |
| 2018/0375838 A1* | 12/2018 | Hersans .................. H04W 4/60 |
| 2019/0149320 A1* | 5/2019 | Keselman ............. G06F 16/248 |
| | | 380/279 |

OTHER PUBLICATIONS

Anonymous: "How to Enable Sensitive Data Redaction 5.14x Cloudera Documentation", dated Apr. 27, 2018, https://web.archive.org/web/20180427075301, 32 pages.

* cited by examiner

*Primary Examiner* — Bai D Vu
(74) *Attorney, Agent, or Firm* — Hickman Becker Bingham Ledesma LLP

(57) ABSTRACT

Techniques are provided for selectively or completely redacting the text of database commands submitted to a database system. The database server receives the clear text version of the commands, parses the commands, and generates an execution plan, as normal. However, prior to providing the text of the commands to any location that is externally visible, the database server determines whether the command qualifies as "sensitive". If the command qualifies as sensitive, then a redacted version of the command is generated. In the case of selective redaction, portions of the redacted version remain in clear text, while selected portions are replaced with encrypted text. In the case of total redaction, the entire command is replaced with encrypted text.

30 Claims, 3 Drawing Sheets

SELECTIVE AND TOTAL QUERY REDACTION

FIELD OF THE INVENTION

The present invention relates to query redaction and, more specifically, to selectively or totally redacting the text of queries issued to a database system.

BACKGROUND

Many users use database systems to store sensitive data. Modern database systems have extensive security capabilities to protect user data from theft, insider threat, and unauthorized access. These controls are all focused around protecting the user data that is managed by the database systems.

Unfortunately, the user data that is managed by a database system may not be the only sensitive information. In particular, there are situations when analysts or applications want privacy when querying the database, because their interest in a situation, company, customer, person or device etc. is highly sensitive. In these cases, the question/query may even be more sensitive than the answer/data.

For example, consider the query:
Select FirstName, LastName
   From Person P
   Where P.SSN='011-45-4167';

This query clearly shows an analyst is looking for the first and last name of the person with social security number "011-45-4167". This query may be issued, for example, as part of an investigation. It may be critical that the specific people targeted by the investigation remain secret.

The following queries are additional examples of queries where the query itself may reveal information that is confidential:

The following query looks up a Credit Card for a charge:
Select FirstName, LastName, ExpDate,cvc
   From Customer C
Where C.Card_type='AMEX'
   and C.Card #='1924 645416 03004'
   and C.Card_Exp>Sysdate;

The following query expresses interest in people with Financial Infractions over $1000.00:
Select FirstName, LastName
   From Person P, Per_of_interest POI
   Where P.SSN=POI.SSN
   and P.event_type='Financial Infraction'
   and P.Amount>1000;

The following query reflects investigative interest in people with names similar to John Smith:
Select SSN, FirstName, LastName
   From Person
   Where P.Lastname=soundex('SMITH')
   and P.Firstname=soundex('JOHN')
   and P.State in ('VA', 'MD', 'CA', 'NY', 'MA')
   and P.last_login_date>sysdate—30;

The follow query may indicate a reduction in force for people with large sales exceeding an expense threshold:
Select SalesPerson, Org, Revenue, Expenses
   from Sales
where Revenue >2,000,000
   and (Expenses/Revenue)>35%;

Even when there is no data that satisfies a sensitive query, such as those set forth above, the query text is very sensitive and visible through (a) a shared cache (e.g. the Shared Global Area (SGA) of Oracle database systems) which stores the clear text version of the queries that have been issued to the database system), (b) tracing/logging tools, (c) SQL_Capture tools, and (d) audit tools. The shared cache is a shared memory area where a database system caches the SQL statements that it has received. Typically, anybody with the appropriate privileges can query the SGA and see the clear text versions of those cached SQL statements.

In conventional database systems, there is no way to hide a sensitive query. Consequently, instead of issuing sensitive queries that specifically target desired information, analysts instead ask very broad non-specific queries, hoping that the specific information they desire is somewhere within the results of the broader query. The results of such broad queries are typically much larger than the desired information, and must be further extracted or refined privately by the end user so as to not expose the true intent of the query. This strategy adds much more overhead to the system, complexity to the process, and latency to the answer, simply to try and maintain some semblance of privacy and to try to avoid the exposure the true interest.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for selectively or completely redacting the text of the database commands submitted to a database system. The database server receives the clear text version of the commands, parses the commands, and generates an execution plan, as normal. However, prior to providing the text of the commands to any location that is externally visible, the database server determines whether the command qualifies as "sensitive". If the command qualifies as sensitive, then a redacted version of the command is generated. In the case of selective redaction, portions of the redacted version remain in clear text, while selected portions are replaced with encrypted text. In the case of total redaction, the entire command is replaced with encrypted text.

Techniques are described hereafter for encrypting sensitive query text and bind values with an authorized user/session Query Encryption Key ("QEK"). With total command redaction, SQL text and bind values remain encrypted at all times other than parse and execution time. Audit events and system logging occurs as normal, except that query text and bind values will be encrypted when written. In one embodiment, when a log includes a redacted command, an identifier of the QEK (a "QEK ID") is also recorded in the log. Thus, the encrypted data of a redacted command can only be unencrypted with the appropriate QEK, and which QEK is appropriate may be determined by the QEK ID in the log.

Database Command Redaction Overview

Figure 1:
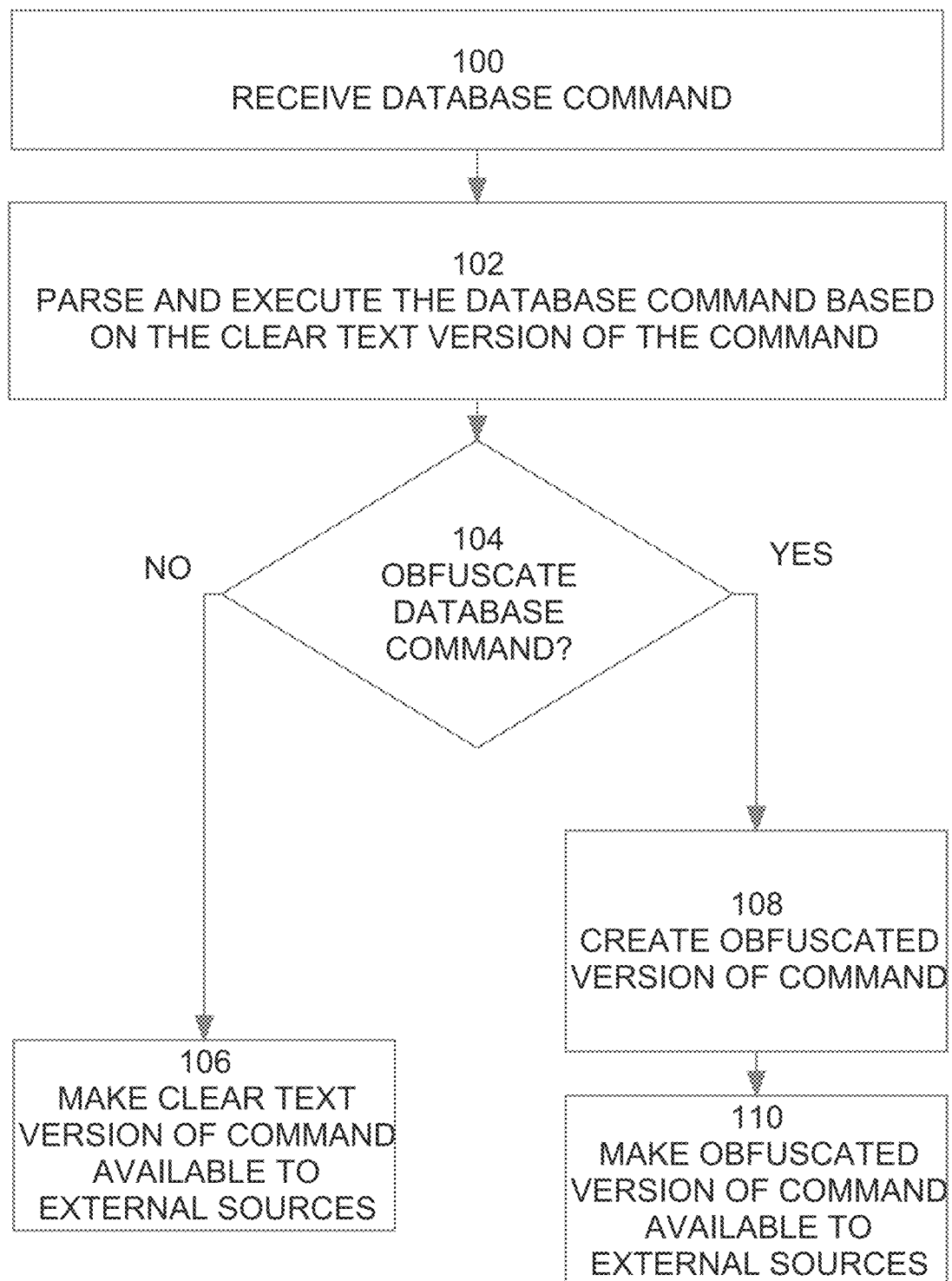
FIG. 1 is a flowchart illustrating general steps for database command redaction, according to an embodiment.

FIG. 1 is a flowchart illustrating general steps for database command redaction, according to an embodiment. At step 100, the database server receives a database command. At step 102, the database server parses and executes the command based on the clear text version of the database command. At step 104, the database server determines whether the database command should be selectively or totally redacted to external sources.

If, at step 104, it is determined that the command is not to be selectively or totally redacted, then control proceeds to step 106 and the clear text version of the command is made available to the external sources. Thus, at step 106, the clear text version of the command may be stored in the Shared Global Area of the computing device on which the database server is executing, written to an audit log, etc.

On the other hand, if it is determined at step 104 that the command is to be selectively or totally redacted, then control proceeds to step 108 and a redacted version of the command is generated. At step 110, the redacted version of the command is made available to the external sources. The steps of determining whether to redact a command, and generating a redacted command shall be described in greater detail hereafter.

Determining Whether to Redact a Database Command

According to an embodiment, not all database commands received by a database system are redacted. Thus, as illustrated in step 104 of FIG. 1, the database server must determine whether a database command qualifies for redaction. In one embodiment, a database command is not redacted unless the database server receives an indication that redaction should be performed.

A database server that employs the command redaction techniques described herein may support various levels of redaction indicators. For example, in one embodiment, redaction may be indicated by:
   a database-wide system parameter
   a session-specific system parameter
   a user-specific system parameter
   a command-specific flag In addition, command redaction may be based on what data is targeted by a database command. Thus, a database server may be configured to redact database commands that:
   target a particular table or a particular set of tables
   target a particular column or a particular set of columns
   target a particular table partition, or a particular set of table partitions
   target a particular tablespace, or a particular set of tablespaces Command redaction may also be based on other criteria. For example, command redaction may be automatically performed for all queries that are submitted during a certain time period, such as on particular days or during particular hours. As another example, command redaction may be automatically performed based on the number of rows returned by a query. For example, command redaction may be automatically performed when a query produces a single result row, or when the number of rows returned by the query is less than a threshold number, or is less than a certain percentage of all rows in the targeted table.

These are merely examples of the various ways redaction may be indicated and/or triggered. The techniques described herein are not limited to any particular manner of indicating that query redaction should be performed.

In one embodiment, certain users are granted a "redacted session" role, which is reflected in their user accounts. Users with such a role may initiate redacted sessions. During a redacted session, all database commands (or a subset of commands, such as queries) are redacted using a user-specific or session-specific QEK. In the case of a session-specific QEK, the user may set a QEK with a password, or request that the database server automatically generate a QEK for the session. The QEK may then be stored in a secure location within the database system, such as the user's "wallet" or other secure storage.

The following is an example of interactions with a database system to authorize a user to use database command redaction. A DBA or User Account Manager grants the Redacted Session role to a user by submitting the following database command:
   SQL> Grant Redacted command to user1 identified by
      'Pass Phrase' |Wallet|External Key Manager;

The Key Manager or a User with the Redacted command role creates and sets a query encryption key for a user. Multiple QEKs may be specified for the same user. When a user has multiple QEKs, the QEKs may be used in a round-robin fashion, where the QEK for the user alternates from session to session, or from command to command within a session.

Two query keys can be created for user1, for example, by submitting the following database commands:
   SQL> Administer Key Management Create Key TAG
      'QEK:USER1:KEY1' identified by welcome1;
   SQL> Administer Key Management Create Key TAG
      'QEK:USER1:KEY2' identified by welcome1;

After the keys are created for user1, a current key may be established for user1 by submitting one of the following database commands:
   SQL> Administer Key Management use Key using TAG
      'QEK:USER1:KEY1' identified by welcome1;
   SQL> alter user USER1 set key 'KEY1' identified by
      welcome1;

Generating a Redacted Version of a Database Command

Once the database server determines that a command qualifies for redaction, a redacted version of the command is generated, as is illustrated in step 108 of FIG. 1. According to one embodiment, the redacted version of a database command is created by replacing clear text in the command with encrypted text. The encrypted text that is used to replace a particular string of clear text is created by encrypting the particular string of clear text using a Query Encryption Key ("QEK"). For example, assume that the following query is subject to total redaction:

Select FirstName, LastName
   From Person P
Where P.SSN='011-45-4167';

Because the query is subject to total redaction, the entire text of the original query string is encrypted, which may produce the encrypted SQL text:
4DF70F835912C3EDB3EDC30E33540BA377B0B4687 EF5A48E975C393314E1 7117AFD1BA5F&77B0B3

As illustrated in step 110 of FIG. 1, the database server provides this encrypted SQL text to all external sources where the SQL text itself would normally be provided. For example, this encrypted SQL text is stored in the SGA of the database server, and is stored in all logs where the SQL itself would normally appear. Thus, the redacted version of the database command is stored in a log where the clear text version would have been stored if the database command had not qualified as sensitive.

For selective redaction, the redacted version of a command is created by encrypting selected portions of the original query using a QEK. The portions that are not encrypted remain in their original clear text form. For example, assume that only the specific social security number that is targeted by the query:

Select FirstName, LastName
   From Person P
   Where P.SSN='011-45-4167';
is to be redacted. Under these circumstances, the redacted version of the query may be:
Select FirstName, LastName
   From Person P
   Where P.SSN=F&77B0B3;

According to one embodiment, when selective redaction is performed, different parts of the database command may be encrypted using different QEKs. For example, social security numbers may be encrypted using one QEK, while phone numbers may be encrypted using a different QEK. By using different QEKs for different parts of a selectively-redacted database command, different decryption keys will be required to recover the clear text of those portions. By making different decryption keys available to different parties, one may control which information, within redacted database commands, is available to different parties.

Figure 2:
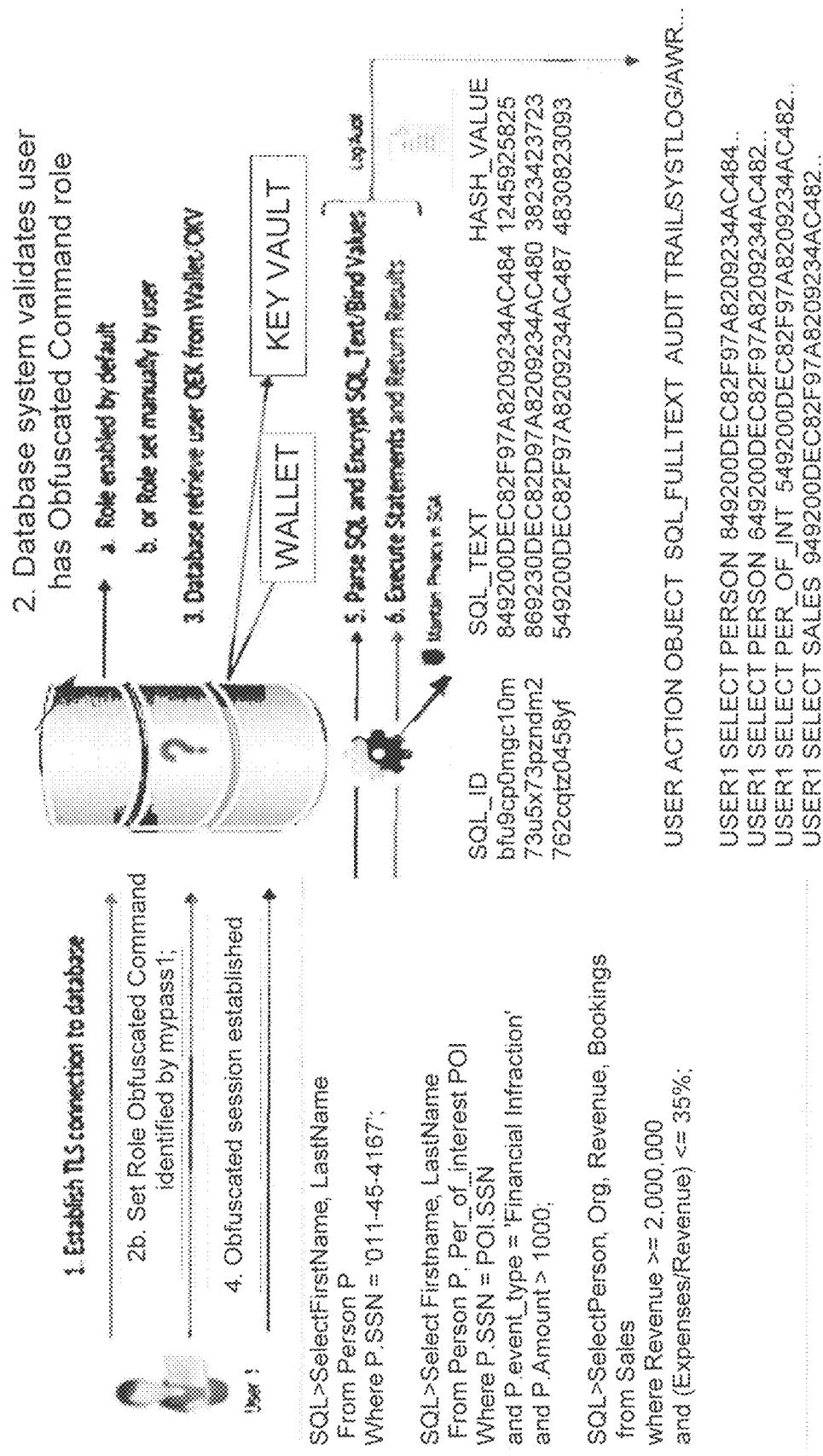
FIG. 2 is a block diagram illustrating interactions with a database system in an embodiment where all queries in a session are redacted.

According to one embodiment, in a situation where all queries in an entire session are to be redacted, the interactions with the database may proceed as illustrated in FIG. 2. Referring to FIG. 2, at step 1, a database client establishes a connection to the database server, to ensure network communication is encrypted. At step 2, the database system validates the user's connection to ensure that the user has been authorized with the Redacted command role. In one embodiment, the redacted command role can be enabled by default or enabled on demand by the user/application. The following commands are examples of how the session can be set to Redacted_Query and how to specify the QEK that is to be used during the session.

SQL> alter session set role Redacted_Command identified by welcome1;
   SQL> alter session set QEK using TAG 'QEK:USER1: KEY5' identified by welcome1;
   SQL> alter session set QEK using TAG 'QEK:USER1: KEY23' identified by welcome1;

At step 3, the database system retrieves the appropriate QEK from a secure location "keystore" in the database. The secure location may be, for example, a user-specific wallet or a key vault.

At step 4, the database client submits SQL statements to the database server for execution as normal. The fact that Redacted_Command is in effect is transparent to the application, so no application changes are required.

At step 5, the database server parses, validates and encrypts the text and bind values of the relevant types of database commands. For example, in a database system that applies redaction only to SELECT statements, only the text and bind variables of those statements are redacted. Other types of statements will be processed as normal.

At step 6, the database server executes the statements independent of whether the SQL text and bind values are encrypted. The database system can decrypt redacted text or bind values as needed if required for execution.

Figure 3:
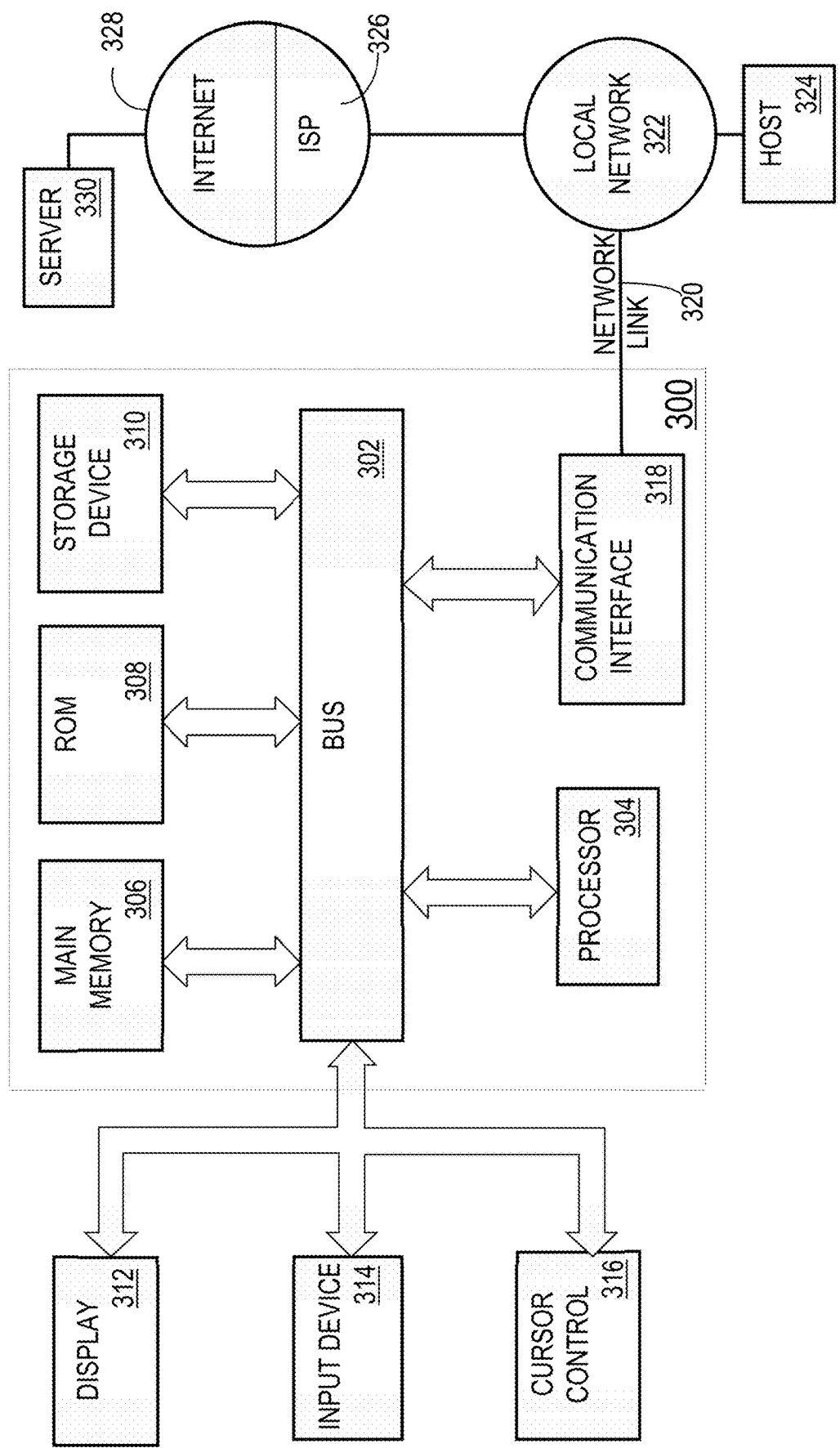
FIG. 3 is a block diagram illustrating a computer system upon which the command redaction techniques described herein may be implemented.

As illustrated in FIG. 3, the SQL Text and bind values are maintained in an encrypted state when:
   Cached in SGA or any cache that is visible to database administrators and/or other users, and
   Persisted in logs, such as Audit Trails, etc.

Recovering the Original Clear Text Version of the Command

Significantly, because the encrypted SQL text in the redacted version of a command is an encryption of the SQL that it is replacing, the original clear text SQL can be reproduced from the redacted version of the command by anyone with access to the appropriate decryption key. Thus, when the following encrypted SQL is encountered in an audit log:
4DF70F835912C3EDB3EDC30E33540BA377B0B4687 EF5A48E975C393314E1 7117AFD1BA5F&77B0B3
   a user with the appropriate decryption key can reproduce the original SQL text:
Select FirstName, LastName
   From Person P
   Where P.SSN='011-45-4167';

In the same manner, selectively redacted commands are encrypted in such a way that one having the proper decryption key can reproduce the original SQL text. For example, the following selectively redacted command:
Select FirstName, LastName
   From Person P
   Where P.SSN=F&77B0B3;
   may be converted back to the original clear text command by applying the appropriate decryption key to the encrypted text "F&77B0B3". Doing so would reproduce the social security number specified in the original SQL command (i.e. '011-45-4167').

Identifying the Encryption Key

As mentioned above, it is desirable to allow users that have the appropriate decryption key to recover the clear text version of a redacted command based on the redacted version of the query. However, to do so, it is necessary for those users to determine which decryption key is the appropriate decryption key.

According to one embodiment, to assist users to determine the appropriate decryption key to decrypt a redacted command, a "QEK identifier" is stored as part of the redacted version of the query. A QEK identifier is any data from which the QEK used to create a redacted version of a database command may be determined. For example, upon creating a QEK for a user, the database server may generate a unique identifier for the QEK. The QEK identifier for a QEK is stored in conjunction with any redacted command that includes data encrypted using the QEK. For example, in the log generated for a session whose commands are encrypted using Key1, the identifier for Key1 may be stored.

The granularity at which QEK identifiers are stored in a log may vary based on the scope at which the corresponding QEK was used. For example, when a single QEK is used to redact all commands in a session, then the QEK identifier for the QEK may be stored once for the entire log of the session. On the other hand, multiple QEKs are used within a session, then a QEK identifier may be stored in conjunction with each command the QEK was used to redact. In the case where different QEKs are used to redact different portions of the same command (e.g. one QEK used to redact social security numbers and a different QEK used to redact telephone numbers), then the corresponding QEK identifiers may be stored in association with the portions of the database command they were used to redact.

Policy-Based Redaction

In one embodiment, instead of or in addition to having user/session-specific command redaction, a database system may support policy-based command redaction. With policy based command redaction, what is redacted is based on stored policies. The policies may be simple or complex. For example, one policy may be to redact individual social security numbers using encryption with a particular QEK. Another policy may be to encrypt the entire commands of all users who are at the vice-president level or higher during the last three weeks of every quarter.

When multiple policies call for the encryption of the same piece of information, the coarser-granularity encryption is used. For example, if one policy calls for an entire command to be encrypted using QEK1, and another policy calls for a portion of the command to be encrypted using QEK2, then the entire command is encrypted using QEK1. In an alternative embodiment, a piece of data may be encrypted multiple times. Thus, QEK2 may be used to encrypt the portion of the command to produce a selectively redacted command, and then that selectively redacted command may be encrypted using QEK1 to produce a fully-redacted command.

Redacted Results

According to one embodiment, when a query is redacted, the database server redacts the results of the query using the same QEK as was used to redact the query. For example, assume that a user submits a query, in a redacted session, to retrieve certain rows from the database system. Assume further that all queries in the redacted session are being encrypted with Key1. Under these circumstances, Key1 is also used by the database server to encrypt the rows selected by the query prior to providing those rows back to the application that submitted the query. Once received at the application, those results may be decrypted using Key1.

According to one embodiment, upon starting a redacted session, a user may specify whether the query results are to be encrypted. If no result encryption is indicated, then the query is redacted by encrypting the query based on a QEK as described above, but the query results are returned without being encrypted using that same QEK.

Redacted Session Context

In one embodiment, some or all of a user's session context with a database system may be redacted. For example, when a user submits a query or Data Manipulation Language command (DML), the database system tracks the username, IP address of client, hostname of client, client program, and time. In one embodiment, some or all of these pieces of information are redacted from audit trails, logs, etc.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, by a database server, a clear text version of a database command;

based on the clear text version, the database server parsing, compiling and executing the database command;

determining that the database command qualifies as sensitive based on one or more criteria;

responsive to determining that the database command qualifies as sensitive based on said one or more criteria, generating a redacted version of the database command;

wherein, in the redacted version of the database command, at least a portion of the database command is encrypted using a particular encryption key; and based on the database command qualifying as sensitive, storing the redacted version of the database command in a log where the clear text version would have been stored if the database command had not qualified as sensitive;

wherein the method is performed by one or more computing devices.

2. The method of claim 1 wherein:

determining that the database command qualifies as sensitive includes receiving, from a user that submits the clear text version of the database command, a redacted query indication; and based on the redacted query indication, the database command is determined to be sensitive.

3. The method of claim 2 wherein the redacted query indication indicates that only the database command qualifies as sensitive.

4. The method of claim 2 wherein the redacted query indication indicates that all database commands in a particular session qualify as sensitive.

5. The method of claim 1 wherein in the redacted version, all portions of the database command are encrypted using the particular encryption key.

6. The method of claim 1 further comprising:

determining that the database command specifies a value for a field that has been designated to be sensitive; and in the redacted version of the database command, a subset of the clear text version is encrypted with the particular encryption key, wherein the subset includes the value for the field.

7. The method of claim 6 wherein:

the value is a first value;
the field is a first field;
the particular encryption key is a first encryption key;
the subset is a first subset;
the method further comprises:

determining that the database command specifies a second value for a second field that has been designated to be sensitive; and in the redacted version of the database command, a second subset of the clear text version is encrypted with a second encryption key, wherein the second subset includes the second value for the second field;

wherein the second encryption key is different from the first encryption key.

8. The method of claim 1 further comprising storing, in the log, a key identifier that corresponds to the particular encryption key.

9. The method of claim 1 wherein executing the database command includes:

generating a result set for the database command;

generating a redacted result set by encrypting at least a portion of the result set with the particular encryption key; and responding to the database command by returning the redacted result set.

10. The method of claim 1 wherein determining that the database command qualifies as sensitive includes determining that a user that submitted the database command has a privilege that allows database command redaction.

11. The method of claim 10 wherein the particular encryption key is an encryption key specified by the user.

12. The method of claim 1 wherein determining that the database command qualifies as sensitive includes determining that a particular field, for which the database command specifies a value, is designated as sensitive.

13. The method of claim 1 wherein determining that the database command qualifies as sensitive includes determining, based on one or more stored policies, that the database command qualifies as sensitive.

14. The method of claim 1 further comprising, based on the database command qualifying as sensitive, storing the redacted version of the database command in a shared memory area where the clear text version would have been stored if the database command had not qualified as sensitive.

15. The method of claim 1 wherein:

the database command was issued in a particular session context; and the method further comprises, based on the database command qualifying as sensitive, redacting from the log one or more pieces of information about the particular session context.

16. One or more non-transitory computer-readable media storing instructions which, when executed by one or more computing devices, cause:

receiving, by a database server, a clear text version of a database command;

based on the clear text version, the database server parsing, compiling and executing the database command;

determining that the database command qualifies as sensitive based on one or more criteria;

responsive to determining that the database command qualifies as sensitive based on said one or more criteria, generating a redacted version of the database command;

wherein, in the redacted version of the database command, at least a portion of the database command is encrypted using a particular encryption key; and based on the database command qualifying as sensitive, storing the redacted version of the database command in a log where the clear text version would have been stored if the database command had not qualified as sensitive.

17. The one or more non-transitory computer-readable media of claim 16 wherein:

determining that the database command qualifies as sensitive includes receiving, from a user that submits the clear text version of the database command, a redacted query indication; and based on the redacted query indication, the database command is determined to be sensitive.

18. The one or more non-transitory computer-readable media of claim 17 wherein the redacted query indication indicates that only the database command qualifies as sensitive.

19. The one or more non-transitory computer-readable media of claim 17 wherein the redacted query indication indicates that all database commands in a particular session qualify as sensitive.

20. The one or more non-transitory computer-readable media of claim 16 wherein in the redacted version, all portions of the database command are encrypted using the particular encryption key.

21. The one or more non-transitory computer-readable media of claim 16 wherein the instructions further cause:
   determining that the database command specifies a value for a field that has been designated to be sensitive; and
   in the redacted version of the database command, a subset of the clear text version is encrypted with the particular encryption key, wherein the subset includes the value for the field.

22. The one or more non-transitory computer-readable media of claim 21 wherein:
   the value is a first value;
   the field is a first field;
   the particular encryption key is a first encryption key;
   the subset is a first subset;
   the instructions further cause:
   determining that the database command specifies a second value for a second field that has been designated to be sensitive; and
   in the redacted version of the database command, a second subset of the clear text version is encrypted with a second encryption key, wherein the second subset includes the second value for the second field;
   wherein the second encryption key is different from the first encryption key.

23. The one or more non-transitory computer-readable media of claim 16 wherein the instructions further cause storing, in the log, a key identifier that corresponds to the particular encryption key.

24. The one or more non-transitory computer-readable media of claim 16 wherein executing the database command includes:
   generating a result set for the database command;
   generating a redacted result set by encrypting at least a portion of the result set with the particular encryption key; and
   responding to the database command by returning the redacted result set.

25. The one or more non-transitory computer-readable media of claim 16 wherein determining that the database command qualifies as sensitive includes determining that a user that submitted the database command has a privilege that allows database command redaction.

26. The one or more non-transitory computer-readable media of claim 25 wherein the particular encryption key is an encryption key specified by the user.

27. The one or more non-transitory computer-readable media of claim 16 wherein determining that the database command qualifies as sensitive includes determining that a particular field, for which the database command specifies a value, is designated as sensitive.

28. The one or more non-transitory computer-readable media of claim 16 wherein determining that the database command qualifies as sensitive includes determining, based on one or more stored policies, that the database command qualifies as sensitive.

29. The one or more non-transitory computer-readable media of claim 16 wherein the instructions further cause, based on the database command qualifying as sensitive, storing the redacted version of the database command in a shared memory area where the clear text version would have been stored if the database command had not qualified as sensitive.

30. The one or more non-transitory computer-readable media of claim 16 wherein:
   the database command was issued in a particular session context; and
   the instructions further cause, based on the database command qualifying as sensitive, redacting from the log one or more pieces of information about the particular session context.

* * * * *